Patented May 19, 1931

1,805,773

UNITED STATES PATENT OFFICE

IRVING F. LAUCKS AND GLENN DAVIDSON, OF SEATTLE, WASHINGTON, ASSIGNORS TO I. F. LAUCKS, INCORPORATED, OF SEATTLE, WASHINGTON, A CORPORATION OF WASHINGTON

VEGETABLE GLUE AND METHOD OF MAKING SAME

No Drawing. Original application filed October 29, 1923, Serial No. 671,381. Divided and this application filed September 23, 1927. Serial No. 221,609.

The art of making a water-proof glue from certain protein materials has been known for some time; thus casein and blood albumin are in common use. These last mentioned compounds, however, have a number of disadvantages from a practical standpoint. Casein is costly and lack of uniformity in the material as derived from various sources is a serious detriment; while blood albumin is not available except in certain situations. There is accordingly a great demand, particularly in the veneer industry where large quantities of glue are consumed, for a new glue that will be cheap and at the same time sufficiently water-proof.

By water-proof, in this connection, it is not meant that glues thus characterized will resist the action of water indefinitely, but it is meant that they are water-proof in the sense in which the term is used in the veneer industry, viz., that a panel can be soaked in cold water for from seventy-two to one hundred hours, or in boiling water for eight hours, without separation.

Vegetable compounds have not, so far as we are aware, been heretofore satisfactorily employed as a basis for waterproof glues of the type in question. It is true that some veneer makers, on account of the high price of casein, have come to use starch glues but these, at least as heretofore made, are not at all water-proof, and vegetable proteins have not heretofore been used at all, so far as we are aware.

We have now discovered, however, that by subjecting the same to proper treatment, such vegetable proteins or vegetable matter containing proteins in proper amount, and for that matter even starch, can be converted into a waterproof glue that will satisfy the rigid requirements of veneer making. The requisite raw material may be derived from a number of sources and the treatment of such material is relatively simple and inexpensive so that as a result we are able to produce a satisfactory glue at a much lower cost than has heretofore been possible.

To the accomplishment of the foregoing and related ends, the invention, then, consists of the combination of ingredients or composition of matter and the steps involved in the preparation of such composition hereinafter fully described and particularly pointed out in the claims, it being understood that such disclosed ingredients and steps constitute but several of the various ways in which the principle of the invention may be used.

We have found that soya bean flour constitutes an admirable raw material for our purpose. Such flour is preferably made by grinding soya bean cake so that 80 per cent. will pass a 100 mesh screen and when treated with certain chemicals, or other modifying substances, we make therefrom a very satisfactory glue that meets the requirements of the veneer trade fully and is in many respects better than the usual glues now on the market. Such bean cake, as analyzed by us, is found to contain on the average 45 per cent. protein, 12 per cent water, 5 per cent cellulose or crude fiber, 7 per cent oil, 6 per cent ash, and 25 per cent carbohydrates.

We do not, however, wish to limit ourselves to soya bean flour or to vegetable protein derived from this source for we have made satisfactory glue by our improved process from a low grade wheat containing approximately 10 per cent protein and there are many other vegetable materials containing protein in amounts intermediate between the percentages thus noted as found in such soya bean flour and wheat or even lower than the percentage in such wheat that may be utilized with satisfactory results.

Soya bean flour made from soya bean cake from which the oil has been expressed, is preferably used in practice because it is cheaper and makes a better glue, but flour made from whole soya beans, without expressing the contained oil, may also be used, although obviously this would not be economical in view of the value which attaches to such oil. As to the fineness of the flour, it is not necessary that the meal be ground as fine as indicated above, but fineness is desirable from a practical standpoint.

When the usual chemicals employed in making casein glue, viz., lime and sodium silicate, are added to a vegetable protein-containing material, for example, soya bean flour, a glue results, but it is not as good as casein glue. It is not as highly water resistant nor as workable. We find, however, by the use of caustic soda with such vegetable protein-containing matter, a much better glue is obtained, such caustic soda apparently playing the part of dispersing the colloidal material. The resultant glue is then somewhat similar in its working properties to casein glue, although its water resistance is still slightly less.

Preferably we react on our vegetable protein-containing material with both caustic soda and lime. As equivalents of such caustic soda, caustic potash and ammonia may be used, although more expensive. Other equivalents of caustic soda are salts of soda (or potash) with weak acids, e. g. sodium phosphate, sodium borate and the like. Similarly in place of lime, magnesia, baryta and strontia may be used as equivalents.

In order to improve the working properties, e. g. the spreading and flow, of the glue produced as aforesaid as well as the water resisting properties, we have found it desirable to add other substances of which the following are examples:—

Copper sulphate, cuprammonium compounds, copper-caustic soda compounds. Equivalents would be other alkali-soluble compounds of copper.

Carbon bisulphide, or generally sulphur-containing compounds which in the composition with the vegetable protein-containing matter provide sulphur derivatives of carbonic acid.

Quebracho, sumach, spruce extract (concentrated sulphite liquor). These are all commonly used tanning agents. Equivalents would be other vegetable tanning agents.

Cresylic acid. Equivalents would be other phenols.

Rosin, sodium or calcium soaps of rosin. Equivalents would be other resins or resin combinations with metals.

In general, we may say that copper salts make the glue more readily workable in the mechanical preparation and application while at the same time imparting increased water resistance; that carbon bisulphide imparts increased water resistance, and the amount where used may vary with the extent of the effect desired, a small per cent. being in general sufficient; that the silicates and related compounds act as thinners in the initial mixing while at the same time increasing the water resistance and the strength of the glue; and that rosin and derivatives thereof act as thinners and make the glue more readily workable. Substances such as the foregoing, which act as a thinner, or render the glue more readily workable, may be appropriately referred to as spreaders.

It has also been found desirable to add to the basic glue composition produced by reacting on protein containing vegetable matter, as described above, other substances which act as retarders, e. g. calcium chloride and sodium chloride. A retarder, in this connection, it should be explained, is a substance which prevents the wet glue after mixing from too quickly setting to a jelly or otherwise thickening so that it cannot be spread. This action, however, is only important where there is to be a considerable delay in applying the glue and in the case of a few of the formulæ that we have used, and most of our glue mixtures have not required the addition of such a retarder.

We have also found that certain substances in presence of lime will act in the same way as the caustic soda and also render the product a very desirable consistency, e. g. sodium phosphate, sodium perborate and sodium sulphite. These salts are all related in that they are combinations of a strong base sodium with a weak acid and there are a number of other salts that fall in the same category and which have a similar effect, so need not be listed in detail.

As examples we may cite the following typical formulæ:—

(1) Mix 30 parts soya bean flour with 120 parts of water; add 13 parts of 18 per cent caustic soda solution and mix; 5 parts carbon bisulphide are then added and stired well; to this 3 parts calcium hydrate are added and stirred in; then 15 parts water glass (sodium silicate) are stitrred in; finally, add 1 part copper sulphate to 5 parts of water and stir in. This makes the finished glue, which is then spread on panels, for example, put under pressure for several hours, whereupon the pressure may be released.

(2) Mix 30 parts soya bean flour, 5 parts rosin, 1½ parts copper sulphate, 1 part quebracho together dry; add 90 parts water and 26 parts 18 per cent caustic soda solution; stir well; add 6 parts calicum hydrate in 15 parts water; then add 15 parts water glass, giving finished glue.

(3) Mix 30 parts soya bean flour, 5 parts of rosin, 1½ parts copper sulphate, ½ part sodium dichromate, 90 parts water, 1 part cresylic acid, 26 parts of 18 per cent caustic soda solution, 6 parts calcium hydrate in 15 parts water, and 15 parts of sodium silicate.

(4). Mix 30 parts soya bean flour in 80 parts of hot water; add 20 parts of 18 per cent. caustic soda solution; stir in 3 parts of hydrated lime in 5 parts of water, stir well; then add seven-tenths (0.7) part copper sulphate in 10 parts of water and stir well.

(5). Mix 30 parts soya bean flour in about 120 parts of water; add 13 parts of 18 per cent. caustic soda solution and stir; 5 parts carbon bisulphide are stirred in also 3 parts calcium hydrate; add 1 part copper sulphate in about 5 parts of water and stir.

Similarly other oil seed flours, wheat flour, etc. may be made up.

The particular order in which the several ingredients are admixed together in the formulæ just given may be varied, and it is not necessary that the manufacture of the product be completed in a single continuous operation, but as a matter of practice we have found it desirable in certain cases to mix only certain of the ingredients initially and then add the others just before the glue is required for use.

It will also be understood, of course, that the foregoing formulæ are typical and that many variations are actually made therein in the compounding of our improved glue. The cited formulæ have under test resisted the action of water for at least 72 hours and in some instances for longer periods.

This application is a division of our application Serial No. 671,381 filed Oct. 29, 1923, Patent No. 1,689,732.

Other modes of applying the principle of our invention may be employed instead of the one explained, change being made as regards the process herein disclosed or the materials employed in carrying out such process provided the stated ingredients and steps or the equivalent of such stated ingredients or steps be employed.

We therefore particularly point out and distinctly claim as our invention:—

1. A method of making an adhesive composition, which comprises treating a proteinous vegetable seed flour including fiber and other natural substances, with an aqueous alkaline medium and an alkali-soluble copper compound.

2. A method of making an adhesive composition, which comprises treating a proteinous vegetable seed flour including fiber and other natural substances, with an aqueous alkaline medium and copper sulphate.

3. A method of making an adhesive composition, which comprises treating soya bean flour with an aqueous alkaline medium and an alkali-soluble copper compound.

4. A method of making an adhesive composition, which comprises treating soya bean flour with an aqueous alkaline medium and copper sulphate.

5. A method of making an adhesive composition, which comprises treating a proteinous vegetable seed flour including fiber and other natural substances, with an aqueous alkaline medium, carbon bisulphide and an alkali-soluble copper compound.

6. A method of making an adhesive composition, which comprises treating a proteinous vegetable seed flour including fiber and other natural substances, with an aqueous alkaline medium, carbon bisulphide and copper sulphate.

7. A method of making an adhesive composition, which comprises treating soya bean flour with an aqueous alkaline medium, carbon bisulphide, and an alkali-soluble copper compound.

8. A method of making an adhesive composition, which comprises treating soya bean flour with an aqueous alkaline medium, carbon bisulphide and copper sulphate.

9. A method of making an adhesive composition, which comprises treating soya bean flour with sodium hydroxide and copper sulphate, in the presence of water, the proportions being about thirty parts of the flour and about one to one and one-half parts of the copper sulphate.

10. A method of making an adhesive composition, which comprises treating soya bean flour with sodium hydroxide, carbon bisulphide, lime, an alkali metal salt, and copper sulphate, in the presence of water, the soya bean flour and the copper sulphate being in the proportions of about thirty parts of the flour and about one to one and one-half parts of the copper sulphate.

11. An adhesive composition, comprising a proteinous vegetable seed flour including fiber and other natural substances, treated with an aqueous alkaline medium and an alkali-soluble copper compound.

12. An adhesive composition, comprising a proteinous vegetable seed flour including fiber and other natural substances, treated with an aqueous alkaline medium and copper sulphate.

13. An adhesive composition, comprising soya bean flour treated with an aqueous alkaline medium and an alkali-soluble copper compound.

14. An adhesive composition, comprising soya bean flour treated with an aqueous alkaline medium and copper sulphate.

15. An adhesive composition, comprising a proteinous vegetable seed flour including fiber and other natural substances, treated with an aqueous alkaline medium, carbon bisulphide and an alkali-soluble copper compound.

16. An adhesive composition, comprising a proteinous vegetable seed flour including fiber and other natural substances, treated with an aqueous alkaline medium, carbon bisulphide and copper sulphate.

17. An adhesive composition, comprising soya bean flour treated with an aqueous alkaline medium, carbon bisulphide and an alkali-soluble copper compound.

18. An adhesive composition, comprising soya bean flour treated with an aqueous alkaline medium, carbon bisulphide and copper sulphate.

19. An adhesive composition, comprising soya bean flour treated with an aqueous alkaline medium, and copper sulphate, in the proportions of about thirty parts of the flour and one to one and one-half parts of the copper sulphate.

20. An adhesive composition, comprising soya bean flour treated with sodium hydroxide, carbon bisulphide, lime, an alkali metal salt, and copper sulphate, in the presence of water, the proportions of the soya bean flour and copper sulphate being about thirty parts of the flour and about one to one and one-half parts of the copper sulphate.

In witness whereof, we hereunto subscribe our names this 12th day of September, 1927, and this 19 day of Sept., 1927.

IRVING F. LAUCKS.
GLENN DAVIDSON.